United States Patent
Lorie et al.

(10) Patent No.: US 6,993,205 B1
(45) Date of Patent: Jan. 31, 2006

(54) AUTOMATIC METHOD OF DETECTION OF INCORRECTLY ORIENTED TEXT BLOCKS USING RESULTS FROM CHARACTER RECOGNITION

(75) Inventors: Raymond Armand Lorie, San Jose, CA (US); Sriganesh Madhvanath, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,359

(22) Filed: Apr. 12, 2000

(51) Int. Cl.
 *G06K 9/36* (2006.01)

(52) U.S. Cl. .................... 382/290; 382/291; 382/292; 382/296; 382/297

(58) Field of Classification Search ............... 382/289, 382/290, 291, 292, 293, 294, 295, 296, 297, 382/176, 174
See application file for complete search history.

(56) References Cited

U.S. PATENT DOCUMENTS

| | | | |
|---|---|---|---|
| 3,831,146 A | 8/1974 | Rundle | 340/146.3 |
| 4,338,588 A | 7/1982 | Chevillat et al. | 340/146.3 |
| 4,723,297 A | 2/1988 | Postl | 382/46 |
| 4,941,189 A | 7/1990 | Britt | 382/46 |
| 5,020,117 A | 5/1991 | Ooi et al. | 382/46 |
| 5,060,276 A | 10/1991 | Morris et al. | 382/8 |
| 5,235,651 A | 8/1993 | Nafarieh | 382/46 |
| 5,276,742 A | 1/1994 | Dasari et al. | 382/46 |
| 5,471,549 A | 11/1995 | Kurosu et al. | 382/290 |
| 5,768,451 A * | 6/1998 | Hisamitsu et al. | 382/309 |
| 6,137,905 A * | 10/2000 | Takaoka | 382/173 |
| 6,151,423 A * | 11/2000 | Melen | 382/289 |
| 6,173,088 B1 * | 1/2001 | Koh et al. | 382/289 |
| 6,249,604 B1 * | 6/2001 | Huttenlocher et al. | 382/174 |

\* cited by examiner

*Primary Examiner*—Jingge Wu
*Assistant Examiner*—Brian Le
(74) *Attorney, Agent, or Firm*—Gibb I.P. Law Firm, LLC; Mark C. McCabe, Esq.

(57) ABSTRACT

The invention determines the correct orientation of text blocks being processed with an optical character recognition computer program. The method determines a recognition confidence of characters in a text block being analyzed by the optical character recognition computer program and evaluates an orientation of the text block based on the recognition confidence.

14 Claims, 2 Drawing Sheets

AUTOMATIC METHOD OF DETECTION OF INCORRECTLY ORIENTED TEXT BLOCKS USING RESULTS FROM CHARACTER RECOGNITION

BACKGROUND OF THE INVENTION

1. Field of the Invention

The invention generally relates to the field of optical character recognition (OCR). More particularly, the invention provides a method and system architecture for optical character recognition which correctly orients characters to be recognized, to improve recognition accuracy and confidence.

2. Background of the Invention

The problem at hand is to recognize the textual information contained in a scanned image. The scanned images can come from a wide variety of source material, such as written answers to printed questions on forms, or mailing addresses on postal envelopes.

OCR systems employ various strategies for isolating small portions of the image (such as groups of numeric digits within telephone numbers or ZIP codes) as connected components, segmenting a connected component into one or several character images and recognizing each such image as representing a specific character.

The process of OCR is prone to errors. Therefore, an OCR system may be designed to identify several alternatives for segmenting a connected component, and several character choices for each character inside a segmentation alternative. The results are typically provided from the output of the OCR system to an application program, such as a text processor or a printer driver. Conventional OCR recognition engines exist, which recognize characters with reasonable accuracy. However, even a 90% accuracy rate at the character level means less than 50% at the word level, so over half of all words contain at least one error.

It is well known that the use of context information in conjunction with OCR helps to improve the level of accuracy realized. For instance, if a connected component is identified as a ZIP code (which consists only of numeric characters), then any character choice within the connected component which is not a numeric character can be dismissed as an incorrect choice.

In conventional systems, the OCR subsystem simply provides any character choices it recognizes to the application program, and the exploitation of context is performed by the application program. However, there are drawbacks in such an approach. If an OCR system scans an image and outputs a single choice for each scanned character, then the application program can try alternate character values for well known confusion possibilities (i and 1, 0 and D, 3 and 5, etc.), or use a fuzzy search to find the best matching word in a dictionary. If the engine returns several choices, then the application program may try to find the most likely sequence of characters based on maximizing some total confidence estimate. But this is by no means an easy task; and it is an inefficient use of programming resources to include, within application programs, the necessary logic and code for each particular application.

Also, there have been conventional efforts for detecting text at different orientations using geometric properties of the characters and the orientation of the lines. These methods are successful to the extent that the geometrical properties are reliable. However, when the spaces between characters are large, the orientation of lines is difficult to decide reliably. Also, conventional methods are generally unable to reliably distinguish inverted text (rotated 180 degrees) which occurs when a document is fed into a scanner upside down, or when only a few pages in a series of many pages are upside down. Therefore, there is a need to improve the orientation recognition of conventional OCR systems.

SUMMARY OF THE INVENTION

It is, therefore, an object of the present invention to provide a structure and method for determining correct orientation of text blocks being processed with an optical character recognition computer program. The method determines a recognition confidence of characters in a text block being analyzed by the optical character recognition computer program and evaluates an orientation of the text block based on the recognition confidence.

The invention extracts a mean length of contiguous high confidence characters in the text block, calculates a proportion of non-invertible characters among high-confidence characters in the text block, and calculates a relative difference between the mean confidence of invertible and non-invertible characters in the text block. The invention can rotate the text block and evaluate a change in confidence level of the characters in the text block. The rotating could comprise inverting the text block.

The invention can also rotate non-invertible characters within the text box. If the text box with rotated non-invertible characters increases a confidence of the low-confidence characters or decreases a confidence of the high-confidence characters, the invention rotates the text block and evaluates a change in confidence level of the characters in the text block.

In a system embodiment, the invention includes a scanner for scanning a text block image, an optical character processor connected to the scanner, and an interface connected to the optical character processor that outputs the text block. The optical character processor determines a recognition confidence of characters in the text block and evaluates an orientation of the text block based on the recognition confidence.

The invention may also include a math processor that extracts a mean length of contiguous high confidence characters in the text block, calculates a proportion of non-invertible characters among high-confidence characters in the text block, and/or calculates a relative difference between the mean confidence of invertible and non-invertible characters in the text block.

The optical character processor may rotate the text block and evaluate a change in confidence level of the characters in the text block. In fact the optical character processor may invert the text block. The optical character processor may rotate the non-invertible characters within the text box. If the text box with rotated non-invertible characters increases a confidence of the low-confidence characters or decreases a confidence of the high-confidence characters, the optical character processor rotates the text block and evaluates a change in confidence level of the characters in the text block.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
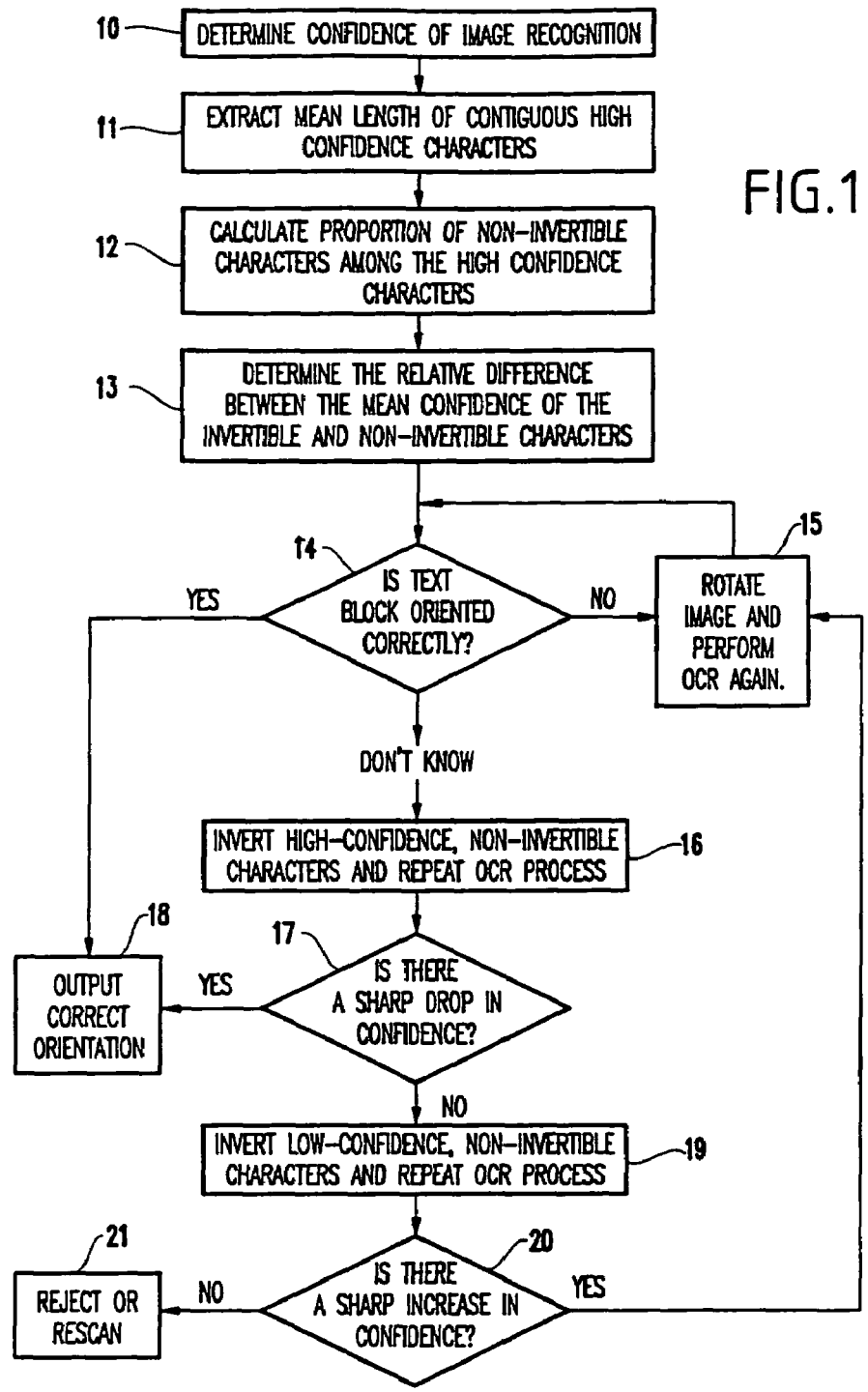
FIG. 1 is a flow diagram illustrating a preferred method of the invention.

The invention solves the problem of conventional OCR systems and increases orientation recognition by concentrating upon the differences in the character recognition results obtained from correctly oriented and incorrectly oriented text blocks. Characters may be classified into those with inversion mappings (those that map into the same or some other valid character when rotated 180 degrees) and those without inversion mappings (those that become invalid symbols when rotated 180 degrees). For example, 'p' and 'S' have inversion mappings ('d' and 'S'), whereas 'A' does not. The former is referred to herein as "invertible" characters and the latter as "non-invertible".

For correctly oriented text blocks, the character recognition confidences of invertible characters tend to be in the same range as those of non-invertible ones. The method described below enables inverted text blocks to be detected based on the results from character recognition. The invention may be used to provide feedback, allowing the system to detect document mis-feeds and/or explore alternative regions of interest. The invention may also be used to categorize text blocks of varying orientation on a single document.

When the text block is inverted, non-invertible characters become invalid symbols and receive markedly lower confidences than invertible characters. The invention uses this confidence differential to detect inverted text blocks.

Specifically, with the invention, three different "features" are extracted from the confidences. First, the invention extracts the mean length of runs (contiguous sub sequences) of high confidence characters. Secondly, the invention measures the proportion of non-invertible characters among the high confidence characters. Finally, the invention calculates the relative difference between the mean confidence of invertible and non-invertible characters.

The features are passed to a genetically evolved function (shown in FIG. 1) that can have one of three possible responses: (i) the text block is correctly oriented, (ii) the text block is inverted, and (iii) the features do not provide enough information to reliably decide one way or the other.

In order to resolve the last category, a second round of character recognition is invoked on selected character images. In particular, high-confidence, non-invertible characters are inverted and re-recognized and the difference in confidence is noted. If the text block was correctly aligned to begin with, there will be a sharp drop in confidence. Simultaneously, non-invertible characters with very low confidence are inverted and re-recognized. If the text block was inverted to begin with, there will be a sharp increase in confidence as a result of the inversion.

The text string "Automatic method of detection" will be used to illustrate an example of the invention's operation. There are 16 non-invertible characters in this string (e.g., A, t, m, a, i, c, e, h, f are non-invertible). When the invention is applied to the original orientation in the foregoing example, the mean run of high confidence characters is equal to the 26 maximum possible. The proportion of non-invertible characters among the high confidence characters is 100%. The relative difference between the mean confidence of the invertible and non-invertible characters is zero because both means were 99%.

The text is then inverted and the optical character recognition is repeated. The mean length run is less than 2, the proportion of non-invertible characters among the high confidence characters is 0% (none of the 16 characters had high confidence). Finally, the relative difference between the mean confidence of the invertible (99%) and the non-invertible characters (7%) is 92%. Given the foregoing results, the inventive classifier would give a "correctly oriented" response for the originally oriented text.

If the threshold values were set so high that the invention could not make a decision between the original an inverted text, the processing would continue and would find 16 non-invertible characters that had high confidence. These 16 would be inverted and the optical character recognition process would be repeated, and a subsequent optical character recognition process would result in a yield of zero confidence. This sharp drop in confidence would indicate that the original orientation was correct.

While not present in this example, if the 16 non-invertible characters had low confidence, the 16 would be inverted and the optical character recognition process would be repeated. This would produce a sharp increase in confidence (99%), indicating that the original orientation was incorrect (however, as mentioned above, this was not the case for this example).

The foregoing discussion illustrates an example of the invention which operates to determine whether text is completely inverted. However, the invention is not limited to only finding text which is inverted. Instead, the invention can determine any incorrect orientation of a text image. For example, if a text page being scanned was not properly aligned on the scanner, the text may suffer from a small or large mis-orientation (e.g., 5–175 degrees). Therefore, the invention accommodates for all distortions between a slight mis-orientation to a complete inversion of text being recognized.

Conventional processes of determining orientation generally use image processing techniques such as projection upon vertical lines (hoping that the text will produce a large number of black pixels, while space lines between text lines would produce very few, if any, black pixels). To the contrary, the invention does not look for the number of black pixels, but instead looks at the different optical character recognition confidences produced when the text is recognized at different rotational angles. The angle which maximizes overall confidence is the orientation which is correct.

The invention can be used to recognize the text in single degree orientation changes, fractions of degree orientation changes, or in multiple degree orientation changes, depending upon the precision required. To increase processing speed, only a limited sample of characters may be observed. Further, processing may be done in parallel for a number of orientations. In addition, the orientation process may begin with large degree changes and, once an approximate orientation is found, smaller degree changes in orientation can be utilized to narrow down the exact orientation.

FIG. 1 is a flowchart which illustrates the process followed by the invention in determining the correct orientation. More specifically, in item 10, a conventional confidence recognition engine outputs an initial image recognition confidence with respect to a character or stream of characters being recognized (e.g., the text block). In item 11, the invention extracts a mean length of contiguous high confidence characters. In item 12, the invention calculates the proportion of non-invertible characters among the high confidence characters. In item 13, the invention determines the relative difference between the mean confidence of the invertible characters and the mean confidence of the non-invertible characters.

From the results of the processing in items 11–13, the invention makes a judgment as to whether the block is oriented correctly in item 14. More specifically, the results from items 11–13 are placed into a classifier. A classifier is a classical mechanism for pattern matching. For example the classifier could separate characters into two classes one being "correctly oriented" and the other being "upside-down". Since no classifier can perform such an operation perfectly, the output from blocks 11–13 is represented by the invention as a set of confidences, one for each class. For example, the text could be classified as confidence a (e.g., correct orientation), confidence b (e.g., incorrect orientation), etc. Each class is provided a certain percentage numerical threshold. Once the confidence classification is below a certain threshold (e.g., none of a or b is >threshold), the invention may declare that the confidence is too low to determine whether the text blocks are oriented correctly.

Each such classifier, before being used, is trained. As would be known by one ordinarily skilled in the art given this disclosure, a training program takes as input, a large set of features and classes. The trainer then accumulates information using at mathematical model and adjusts the model parameters until it reaches a stable state.

If item 14 determines that the text has been oriented correctly, the process terminates and outputs the correct orientation, as shown in item 18. If the image is not oriented correctly the image is rotated in item 15 and the processing is repeated on the rotated image beginning with item 10. For example, in the embodiment discussed above (which determines whether text is inverted), the image would be rotated 180 degrees in item 15 and OCR would be performed on the rotated image.

On the other hand, other levels of incorrect orientation can be explored with the invention by only rotating the image a limited amount and repeating the process on the slightly rotated image.

In addition, as mentioned above the processing in item 14 may produce results which indicate that it cannot be determined whether the text block is oriented correctly. When the invention does not know whether the text block is oriented correctly, the processing proceeds to item 16 wherein the high confidence non-invertible characters are rotated and the OCR process in repeated. Again, this rotation can take a number of different forms depending upon the level of mis-orientation the invention seeks to correct. In the preceding example (which determines whether text is inverted) this rotation could comprise a 180 degree rotation.

Then, as shown in item 17, if the confidence level of high confidence characters decreases sharply (based on any useful threshold of confidence drop) because of the rotation of non-invertible characters in item 16, the unrotated text block is in the correct orientation and processing again proceeds to item 18.

If there is not a sharp drop in confidence as a result of the activity in item 17, processing proceeds to item 19 wherein the low confidence non-invertible characters are rotated and the OCR process in repeated. As shown in item 20, if the confidence level of low confidence characters increases sharply after the rotation of non-invertible characters in item 19, the unrotated text block was the incorrect orientation and processing passes to item 15, where the image is rotated, as discussed above. To the contrary, the confidence of the low confidence non-invertible characters does not sharply change because of the processing in item 19, this indicates that the text cannot be recognized and processing proceeds to item 21, where the text block is rejected (or the original scanning or other process is repeated).

The invention is highly reliable since it is based on character recognition confidences. The invention is capable of distinguishing correctly aligned text from text at other orientations (including inverted text).

Figure 2:
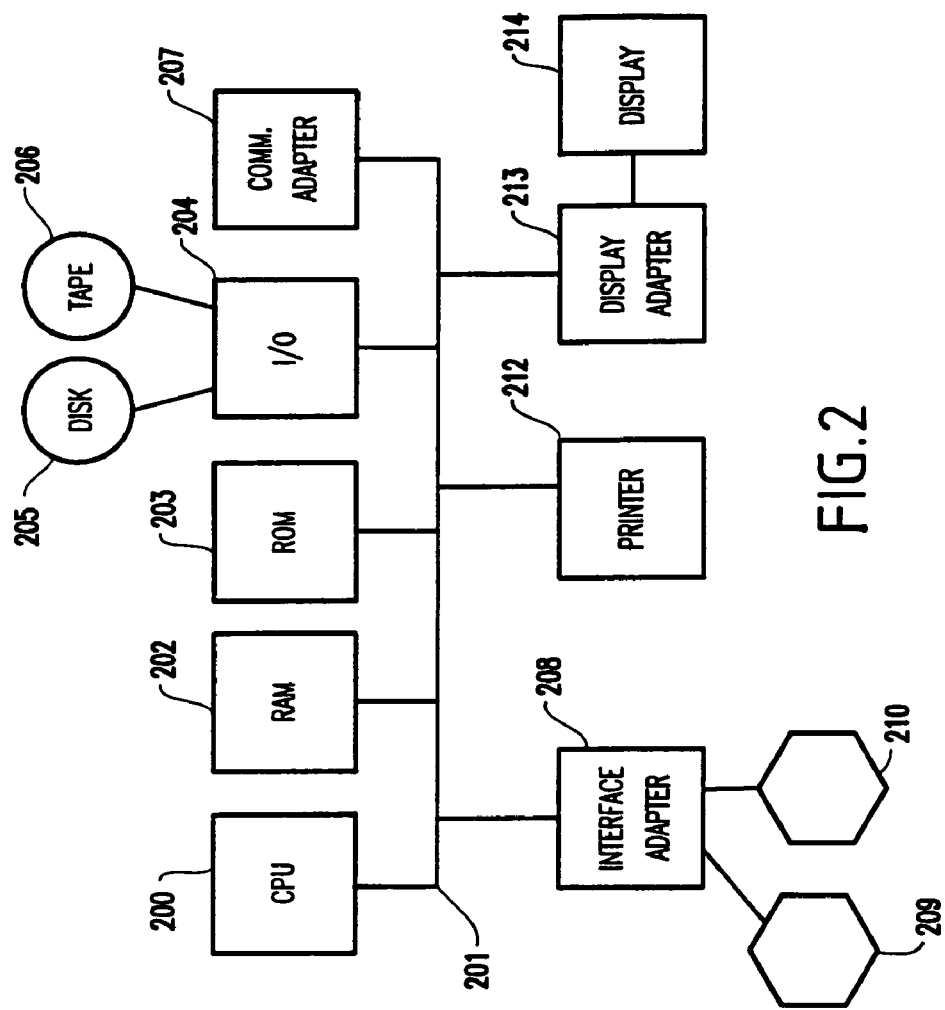
FIG. 2 is a schematic hardware diagram illustrating a preferred computerized system of the invention.

While the overall methodology of the invention is described above, the invention can be embodied in any number of different types of systems and executed in any number of different ways, as would be known by one ordinarily skilled in the art. For example, as illustrated in FIG. 2, a typical hardware configuration of an information handling/computer system in accordance with the invention preferably has at least one processor or central processing unit (CPU) 200. For example, the central processing unit 200 could include various image processing units, mapping units, weighting units, adders, subtractors, comparators, etc. Alternatively, as would be known by one ordinarily skilled in the art given this disclosure, multiple specialized CPUs (or other similar individual functional units) could perform the same processing, mapping, weighting, adding, subtracting, comparing, etc.

The CPU 200 is interconnected via a system bus 201 to a random access memory (RAM) 202, read-only memory (ROM) 203, input/output (I/O) adapter 204 (for connecting peripheral devices such as disk units 205 and tape drives 206 to the bus 201), communication adapter 207 (for connecting an information handling system to a data processing network) user interface adapter 208 (for connecting a peripherals 209, 210 such as a keyboard, mouse, microphone, speaker, scanner, and/or other user interface device to the bus 201), a printer 212, and display adapter 213 (for connecting the bus 201 to a display device 214). The invention could be implemented using the structure shown in FIG. 2 by including the inventive method within a computer program stored on the storage device 205. Such a computer program would act on scanned images supplied through the interface units 209, 210 or through the network connection 207. The system would then automatically produce the final desired product (e.g., the recognized text) on the display 214, through the printer 212 or back to the network 207.

While the invention has been described in terms of preferred embodiments, those skilled in the art will recognize that the invention can be practiced with modification within the spirit and scope of the appended claims.

What is claimed is:

1. A method for determining correct orientation of text blocks being processed with an optical character recognition computer program, said method comprising:
   - determining a recognition confidence of characters in a text block being analyzed by said optical character recognition computer program; and
   - evaluating an orientation of said text block based on said recognition confidence;
   - wherein said evaluating further comprises extracting a mean length of contiguous high confidence characters in said text block.

2. A method for determining correct orientation of text blocks being processed with an optical character recognition computer program, said method comprising:
   - determining a recognition confidence of characters in a text block being analyzed by said optical character recognition computer program; and
   - evaluating an orientation of said text block based on said recognition confidence;
   - wherein said determining produces high-confidence characters having a confidence rating higher than low-confidence characters, and
   - wherein said evaluating further comprises calculating a proportion of non-invertible characters among high-confidence characters in said text block.

3. A method for determining correct orientation of text blocks being processed with an optical character recognition computer program, said method comprising:
    determining a recognition confidence of characters in a text block being analyzed by said optical character recognition computer program; and
    evaluating an orientation of said text block based on said recognition confidence;
    wherein said evaluating further comprises calculating a relative difference between mean confidence of invertible and non-invertible characters in said text block.

4. A method for determining correct orientation of text blocks being processed with an optical character recognition computer program, said method comprising:
    determining a recognition confidence of characters in a text block being analyzed by said optical character recognition computer program; and
    evaluating an orientation of said text block based on said recognition confidence;
    wherein said determining produces high-confidence characters having a confidence rating higher than low-confidence characters,
    said method further comprises rotating non-invertible characters within said text box,
    wherein if a confidence of high-confidence non-invertible characters decreases, said method identifies an original orientation as a correct orientation, and
    wherein if a confidence of low-confidence non-invertible characters increases, said method further comprises rotating said text block and evaluating a change in confidence level of said characters in said text block.

5. A system for determining correct orientation of text blocks being recognized comprising:
    a scanner for scanning a text block image;
    an optical character processor connected to said scanner; and
    an interface connected to said optical character processor that outputs said text block,
    wherein said optical character processor determines a recognition confidence of characters in said text block and evaluates an orientation of said text block based on said recognition confidence further comprising a math processor that extracts a mean length of contiguous high confidence characters in said text block.

6. A system for determining correct orientation of text blocks being recognized comprising:
    a scanner for scanning a text block image;
    an optical character processor connected to said scanner; and
    an interface connected to said optical character processor that outputs said text block,
        wherein said optical character processor determines a recognition confidence of characters in said text block and evaluates an orientation of said text block based on said recognition confidence;
    wherein said optical character processor produces high-confidence characters having a confidence rating higher than low-confidence characters, said system further comprising a math processor that calculates a proportion of non-invertible characters among high-confidence characters in said text block.

7. A system for determining correct orientation of text blocks being recognized comprising:
    a scanner for scanning a text block image;
    an optical character processor connected to said scanner; and
    an interface connected to said optical character processor that outputs said text block,
    wherein said optical character processor determines a recognition confidence of characters in said text block and evaluates an orientation of said text block based on said recognition confidence further comprising a math processor that calculates a relative difference between mean confidence of invertible and non-invertible characters in said text block.

8. A system for determining correct orientation of text blocks being recognized comprising:
    a scanner for scanning a text block image;
    an optical character processor connected to said scanner;
    an interface connected to said optical character processor that outputs said text block,
        wherein said optical character processor determines a recognition confidence of characters in said text block and evaluates an orientation of said text block based on said recognition confidence;
    wherein said optical character processor produces high-confidence characters having a confidence rating higher than low-confidence characters and rotates non-invertible characters within said text box,
    said optical character processor rotating non-invertible characters within said text box,
    wherein if a confidence of high-confidence non-invertible characters decreases, said optical character processor identifies an original orientation as a correct orientation, and
        wherein if a confidence of low-confidence non-invertible characters increases, said optical character processor rotates said text block and evaluates a change in confidence level of said characters in said text block.

9. A program storage device readable by machine, tangibly embodying a program of instructions executable by the machine to perform a method for determining correct orientation of text blocks being processed with an optical character recognition computer program, said method comprising:
    determining a recognition confidence of characters in a text block being analyzed by said optical character recognition computer program; and
    evaluating an orientation of said text block based on said recognition confidence and upon whether characters in said text block have inversion mappings and are capable of being recognized as valid characters when inverted; and
    wherein said evaluating further comprises extracting a mean length of contiguous high confidence characters in said text block.

10. A program storage device as in claim 9, wherein said determining produces high-confidence characters having a confidence rating higher than low-confidence characters, and
    wherein said evaluating further comprises calculating a proportion of non-invertible characters among high-confidence characters in said text block.

11. A program storage device as in claim 9, wherein said evaluating further comprises calculating a relative difference between mean confidence of invertible and non-invertible characters in said text block.

12. A program storage device as in claim 9, wherein said evaluating further comprises rotating said text block and evaluating a change in confidence level of said characters in said text block.

13. A program stowage device as in claim 9, wherein said determining produces high confidence characters having a confidence rating higher that low-confidence characters, said method further comprises rotating non-invertible characters within said text box, wherein if a confidence of high-confidence non-invertible characters decreases, said method identifies an original orientation as a correct orientation.

14. A program storage device as in claim 12, wherein said rotating comprises inverting said text block.

* * * * *